US005229932A

United States Patent [19]

Connell et al.

[11] Patent Number: 5,229,932

[45] Date of Patent: * Jul. 20, 1993

[54] METHOD AND APPARATUS FOR CATEGORIZING AND CERTIFYING MAIL BATCHES

[75] Inventors: Richard A. Connell, South Salem; Raymond Keating, Purdys, both of N.Y.; Ronald P. Sansone, Weston; Karl H. Schumacher, Westport, both of Conn.

[73] Assignee: Pitney Bowes Inc., Stamford, Conn.

[ * ] Notice: The portion of the term of this patent subsequent to Apr. 2, 2008 has been disclaimed.

[21] Appl. No.: 391,806

[22] Filed: Aug. 8, 1989

Related U.S. Application Data

[63] Continuation-in-part of Ser. No. 234,977, Aug. 23, 1988, Pat. No. 5,005,124.

[51] Int. Cl.[5] ....................... G06F 15/21; G07B 17/00

[52] U.S. Cl. ............................... 364/401; 364/464.02; 364/464.03

[58] Field of Search ................ 209/900, 584; 364/401, 364/406, 464.02, 478, 464.03; 382/1

[56] References Cited

U.S. PATENT DOCUMENTS

| | | | |
|---|---|---|---|
| 3,901,797 | 8/1975 | Storace et al. | 209/900 |
| 4,106,060 | 8/1978 | Chapman, Jr. | 358/256 |
| 4,136,780 | 1/1979 | Hunter et al. | 209/900 |
| 4,247,008 | 1/1981 | Dobbs | 209/584 |
| 4,319,328 | 3/1982 | Eggert | 364/466 |
| 4,377,214 | 3/1983 | Hansen et al. | 177/25 |
| 4,511,793 | 4/1985 | Racanelli | 235/375 |
| 4,516,209 | 5/1985 | Scribner | 364/466 |
| 4,516,264 | 5/1985 | Corvari et al. | 382/46 |
| 4,632,252 | 12/1986 | Haruki et al. | 209/546 |
| 4,800,506 | 1/1989 | Axelrod et al. | 364/478 |
| 4,821,195 | 4/1989 | Baer et al. | 364/464.02 |
| 4,849,884 | 7/1989 | Axelrod et al. | 364/406 |
| 4,868,757 | 9/1989 | Gil | 364/464.03 |
| 4,908,768 | 3/1990 | Gelfer et al. | 364/464.03 |
| 5,005,124 | 4/1991 | Connell et al. | 364/401 |

*Primary Examiner*—Roy N. Envall, Jr.
*Assistant Examiner*—David Huntley
*Attorney, Agent, or Firm*—Peter Vrahotes; Melvin J. Scolnick

[57] ABSTRACT

Apparatus for categorizing and certifying a batch of mail by determining parameters of the mail pieces of such batch. The parameters that are determined include the physical dimensions, the weight, the size, class, readability, print contrast and reflectivity of the mail pieces. Based upon these determinations, the deliverability of the mail can be assessed. The mail pieces are also weighed, sized and the class of mail determined and postage amount is checked for the purpose of assuring the accuracy of the postage paid for the mail.

8 Claims, 4 Drawing Sheets

PROGRAM FOR COMPLIANCE AND CATEGORIZATION

MAIL BATCH DELIVERABILITY

METHOD AND APPARATUS FOR CATEGORIZING AND CERTIFYING MAIL BATCHES

BACKGROUND OF THE INVENTION

The application is a continuation-in-part of application Ser. No. 234,977, filed Aug. 23, 1988 and entitled METHOD AND APPARATUS FOR CATEGORIZING AND CERTIFYING MAIL, now U.S. Pat. No. 5,005,124.

Throughout the history of the Post Office, there has been a gradual development whereby the Post Office encourages mailers to prepare their mail in such a way as to reduce the effort required on the part of the Post Office for processing such mail. As an inducement to the mailer to prepare the mail in such a manner so as to bring about faster mail deliver, the st Office offers mailers a discount on such items as pre-sorted mail, printing of zip codes and pre-printed bar codes to augment automatic processing with machines such as optical character recognition (OCR) sorters and bar code readers and sorters.

Even with the present reduced postage rates for presorted zip code mail and the like, the Post Office is experiencing difficulties in processing the mail not only because of the ever increasing volume of mail that is required to be delivered, but also because a significant amount of mail presented to the Post Office is not in compliance with postal regulations regarding acceptability for automatic processing. Checking Compliance of the mail and accuracy of postage paid for the bulk mail had to be done manually. To overcome these problems, the Post Office has gone to large mailers and industries involved in the processing of mail for the purpose of creating schemes whereby the Post Office and mailer could work closely together to reduce the burden upon the st Office as a result of such increasing volumes of mail, to reduce non-compliant mail and to eliminate manual acceptance procedures now required by the Post Office.

SUMMARY OF THE INVENTION

A system and method has been conceived whereby mail will be categorized and certified to allow the Post Office to eliminate its manual acceptance procedures and promote greater efficiencies in its scheduling, equipment and manpower. By categorizing it is meant the physical parameters of the mail such as size, readability and the like will be checked and recorded. By certifying it is meant the checking of postage paid, the compliance standards being met and the like. In the past, the mail has been delivered to the Post Office by the mailer without the Post Office having any forwarning as to the accuracy of payment, quantity of mail, and the deliverability of such mail. As a result, the Post Office had no way of scheduling its mail and simply had to process the mail as it was received and manually determine accuracy of postage payment. This led to certain inefficiencies because the Post Office did not know how it was to schedule its manpower, and was not sure which of its equipment should process which batch of mail. For example, many large Post Offices and selected postal centers have sorters with optical character reading capability, OCR machines. As one might imagine, not all OCR machines the same. Some are able to handle mail more efficiently that has low contrast, whereas other OCR machines require high contrast in the address line. By having a report as to the quality of mail, particularly the contrast of the printing on the address line, the Post Office could arrange to have the mail sent to an OCR machine that could best process the mail. Other types of variations are font type and reflectivity. Another problem has to do with manpower. If the Post Office is aware that high quantities of mail are to be received in the near term, it can arrange its manpower to accommodate such mail. On the other hand, if large volumes of mail are not going to be received, then the manpower can be diverted to other activities. More importantly, a certification report would eliminate the need for manual acceptance.

To accommodate the Post Office in this manner, a system has been devised whereby a batch of mail will be analyzed for the purpose of determining the quantity of mail, the quality of mail in terms of readability, the deliverability of such mail in terms of the accuracy of the addresses printed on the mail. The size of the mail pieces will be determined to assure that they are within the specifications of the Post Office regulations. Upon these quality and quantity parameters being determined, a report will be submitted to the Post Office that will include a certification for the postage required for the mail. With such a report, the Post Office is then in a position to arrange scheduling of both the equipment and manpower for the purpose of handling the mail. Although mail from an individual mailer alone will not affect the operation of the Post Office greatly, when one considers that a given Post Office will handle hundreds of large mailers a day, this concept whereby the mailers provide the Post Office with a report of the mail that is to be received, and a certification of the postage paid that will enable the Post Office to handle such mail more efficiently.

DETAILED DESCRIPTION OF THE PREFERRED EMBODIMENT

Figure 1:
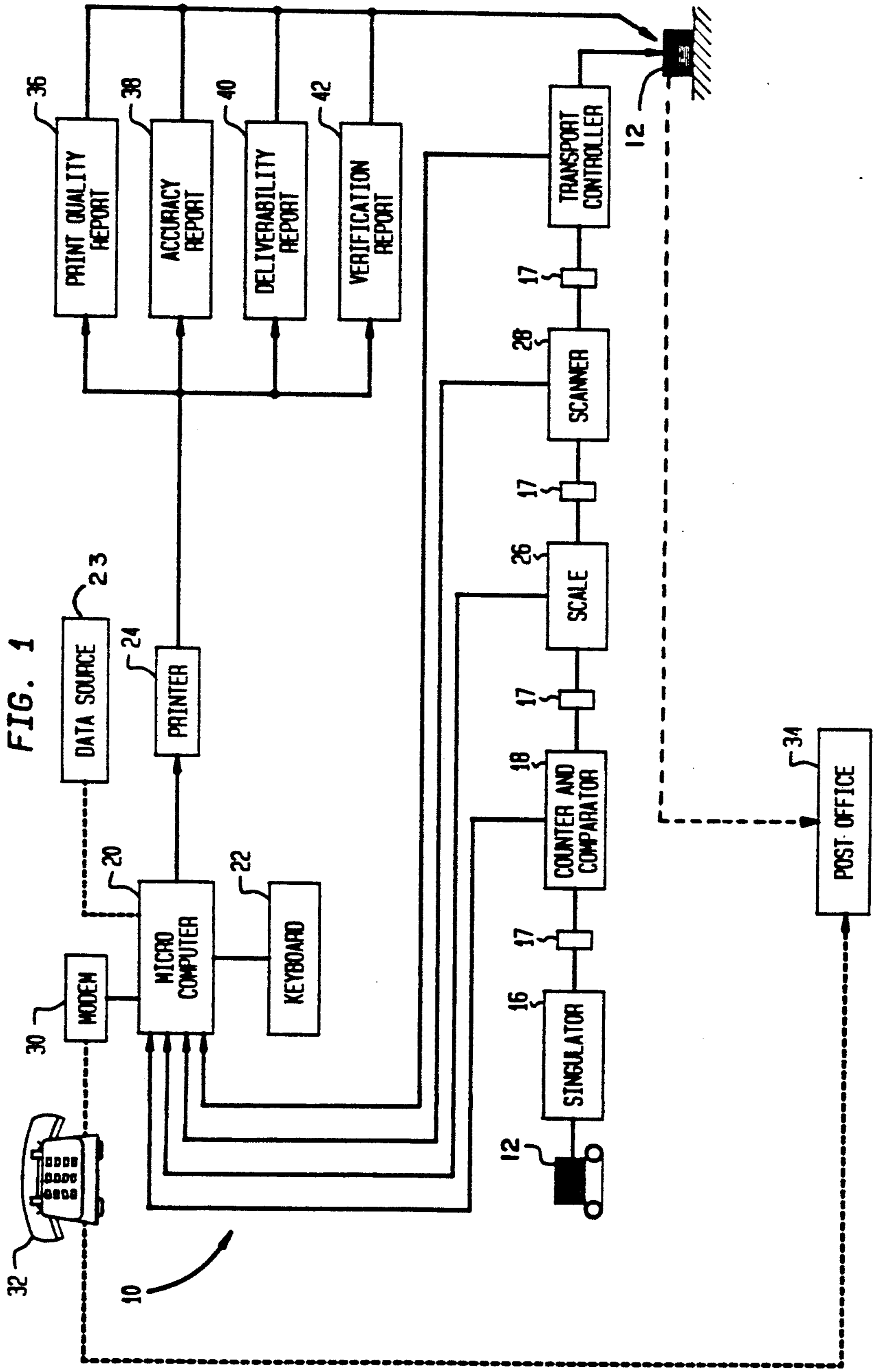
FIG. 1 is a block diagram showing the various components of the mail certification system; and, FIG. 2–4 are flow charts that reflect the program that controls the functions of the components shown in FIG. 2.

Referring now to FIG. 1, when a batch of mail is to be certified and categorized, the batch of mail is delivered to a location that carries out this function. The location may be at the Post Office, upon the premises of the mailer and operated by the mailer, or it may be at the location of an independent contractor who performs the service on behalf of both the mailer and the Post Office. A batch of mail, indicated at 12, may include a large number of mail pieces, as for example 20,000 mail pieces that will be certified and categorized. It will be appreciated that a statement sheet such as a Post Office 3602 form will accompany the batch 12. This statement sheet would disclose the volume of mail, the various classes within the mail, the different levels of pre-sort and carrier routes, the total weight of the mail, and the rates. This statement sheet will then become part of the data that will subsequently be submitted to the Post Office. The mail pieces 12 are initially passed through a singulator 16 that will transport the mail pieces in series for further processing along a conveyor 17, such as a belt conveyor, represented by the small blocks between components. These mail pieces 12 will be passed by a counter and comparator 18. At the counter and comparator 18 an ordinal number will be assigned to each mail piece in consecutive order, and these number will be stored within the microcomputer 20 which is in communication with the counter and comparator so as to identify each mail piece individually. This will allow the system to track each mail piece as it is processed. The microcomputer 20 will have a data base that stores an address reference file that includes national zip+4 list and associated address correlation data. The counter comparator 18 will measure the package dimensions to determine if any mail pieces 12 fall outside the categories that are set by the Post Office for such mail. If they are outside of the category set by the Post Office, this dimensional non-compliance will be transmitted to the microcomputer 20 and stored in a non-compliance list. The microcomputer has a keyboard 22 therein through which data can be input. For example, the class of mail for the batch of mail 12 can be input and, in assigning ordinal numbers to the mail pieces, a particular sequence of numbers can be input through the keyboard and the mailer will be charged an additional amount. Again, this dimensional data is transmitted to the microcomputer. The microcomputer has a keyboard 22 therein to which data may be input. For example, in assigning ordinal numbers to the mail pieces, a particular sequence of numbers may be desired, and this will be placed in by the keyboard. More importantly, data from a statement sheet for the batch of mail 12, such as a form 3602 or form 3541, will be entered through the keyboard 22. Alternatively, such statements sheets data can be entered from an outside source 23 such as the mailer's main frame computer. A printer 24 is in communication with the microcomputer 20 so as to print reports which will hereinafter be described.

After the mail piece leaves the counter and comparator 18, it will be transported to a scale 26 which is in electrical communication with the microcomputer 20. The scale should be of a type that is able to weigh a mail piece rapidly and accurately. An example of such a scale is shown and described in U. S. Pat. No. 4,778,018. After the weight is obtained, the weight is transmitted to the microcomputer 20 and the mail piece is then forwarded to a scanner 28. The latter will identify and read the last line of the address block, which gives the city, state and zip code and measures certain parameters of the mail pieces such as print contrast, surface reflectivity, print font style. The scanner 28 in combination with the microcomputer 20 will perform a number of functions. Firstly, the geographical distribution of the mail will be determined. This will allow the Post Office to be aware of which regional centers the mail is to be sent. The combination will also determine the accuracy of the zip or the zip+4 addressing. The lettering used to address the mail piece will be determined, i.e. the type of font used. This is useful information to the Post Office since some OCR machines are more capable of reading one type of font as opposed to a different type. The readability of the mailing address will be determined based upon the contrast and reflectivity of the mail pieces. This information will be sent to the microcomputer and stored in memory. The mail pieces will then be passed on to the transport controller whereby the mail pieces eventually will be stacked. While such transporting is going on, certain activities are undertaken by the microprocessor. The zip codes that are determined from the mail will be compared against the national zip+4 data base and retrieved. If the zip code is not found, an indication as such is stored as undeliverable for bad zip code. In the alternative, one can compare the zip coded city and state to be written, city and state address, and if there are any mismatches it is recorded as being undeliverable. If the mail is pre-barcoded, the bar code is decoded and compared to the zip code. If there is a mismatch, again it is marked as undeliverable. If manifest mail is being processed, an accuracy analyst is made of the manifest key line.

At the end of the categorizing, an OCR readability and mail compliance and deliverability summary is prepared. Then a comparison is made between the data represented by the statement sheets and that obtained from the processed mail. The amount of correlation is then stored.

After the microcomputer has been uploaded with the data from the various units, it will correlate the data and cause the printer 24 to print a print quality report 36, an accuracy report 38, a deliverability report 40, and a verification report 42. The print quality report will not only indicate the quality of the printing, but the type of font used as well. The accuracy report correlates the findings of the processing to the data on the statement sheet. The deliverability report will indicate the percentage of that mail being received by the Post Office that will actually be in a condition to be delivered. The verification report will then verify the postage paid for the batch of mail.

Upon the various parameters being determined, the microcomputer will then contact the Post Office through a telephone or fax 32 that is in communication with a computer through a modem 30 when the categorizing and certification takes place away from the Post Office. Obviously, if such processing takes place at the Post Office, the report will be on site. Upon receipt of this information by the Post Office, the Post Office will now have the ability to determine the correctness of the postage paid, forecast workloads and can accommodate its equipment in manpower based upon such a forecast. The forecast of the work loads would allow the Post Office to process mail with equipment that is being able to handle the incoming mail pieces. For example, some mail pieces can only read bar codes, whereas others are capable of reading OCR. If the mail coming in has preprinted bar codes, then the Post Office is able to process such mail using a machine that has bar code reading capability only. On the other hand, if the bar coding is non-existent or inaccurate, then the Post Office would process the mail through an OCR machine. In addition to this, various OCR machines have their own characteristics. For example, some OCR machines are capable of reading different fonts better than other OCR machines. On this basis, a particular font will be sent to an OCR machine best capable of reading such font. In addition, some OCR machines are affected by low contrast, where others are not. Consequently, if a batch of mail is received where there is low contrast, it would be sent to an OCR machine that is not so badly affected by such low contrast. Another question is reflectivity. Again, some OCR machines do not perform well with mail pieces that have high reflectivity; whereas, other machines are not affected by such. On this basis, the Post Office will have a better opportunity of preparing for the incoming mail.

After the data has been collected, the print quality report 36, accuracy report 38, delivery report 40, and verification report 42 will be placed with the batch 12. Although these reports 36, 38, 40, 42 are shown separately, it will be appreciated that the information from each can be placed on a single sheet to form a single report. Upon completion of the various reports, the batch mail 12 will then be delivered to the Post Office along with the reports if processing is performed outside of the Post Office. As stated previously, by the time the batch mail 12 reaches the Post Office, the Post Office will be in a position whereby it will have a good idea as to how to handle the mail, and have a certification report upon which the Post Office can rely to assure that payment accompanying the mail is correct without having to conduct manual acceptance procedures. If the payment is not correct, the Post Office can either collect for a postage shortage on the mailer's account can be debited by the microcomputer 20 for such postage due.

Figure 2:
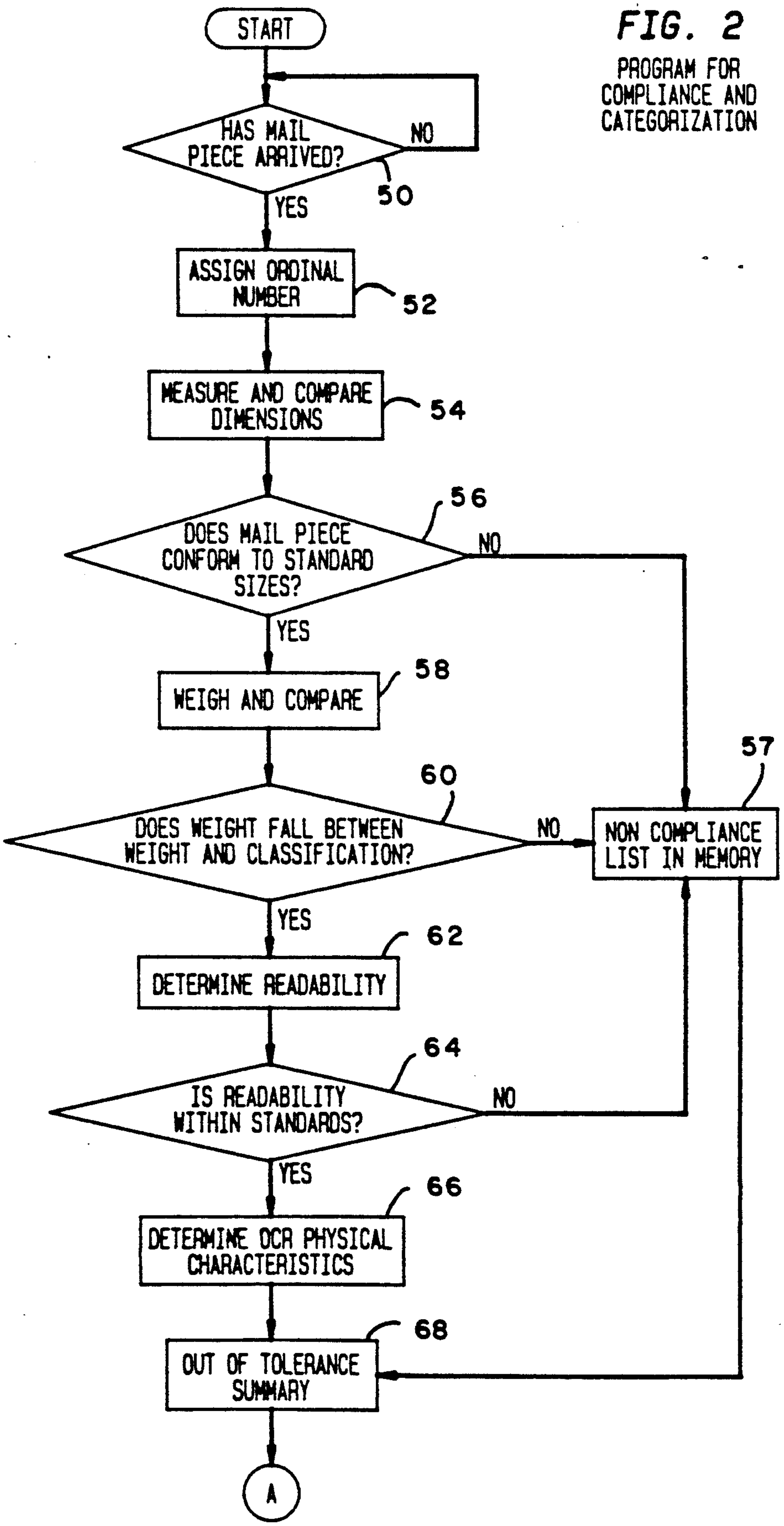
Figure 3:
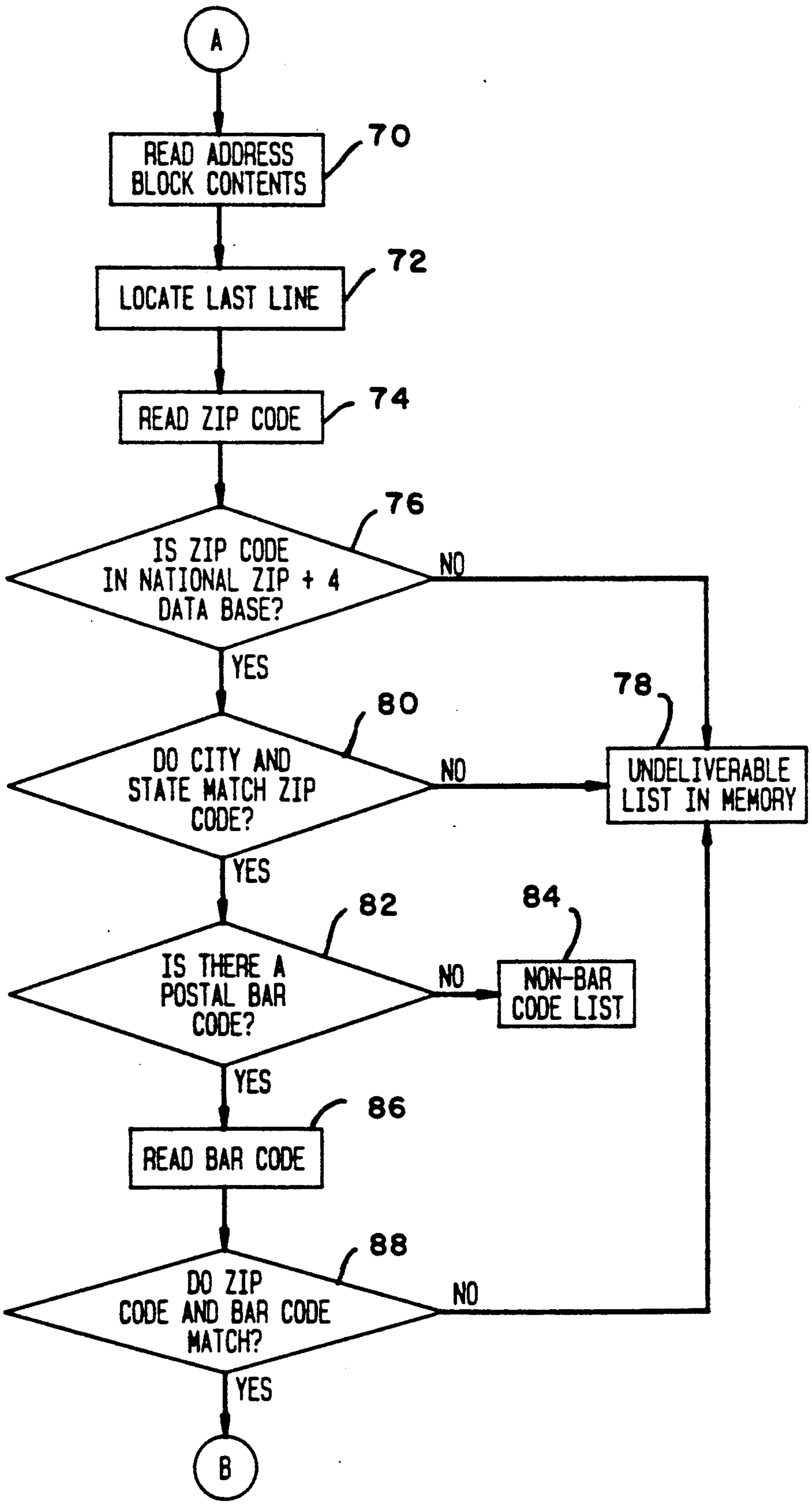
Figure 4:
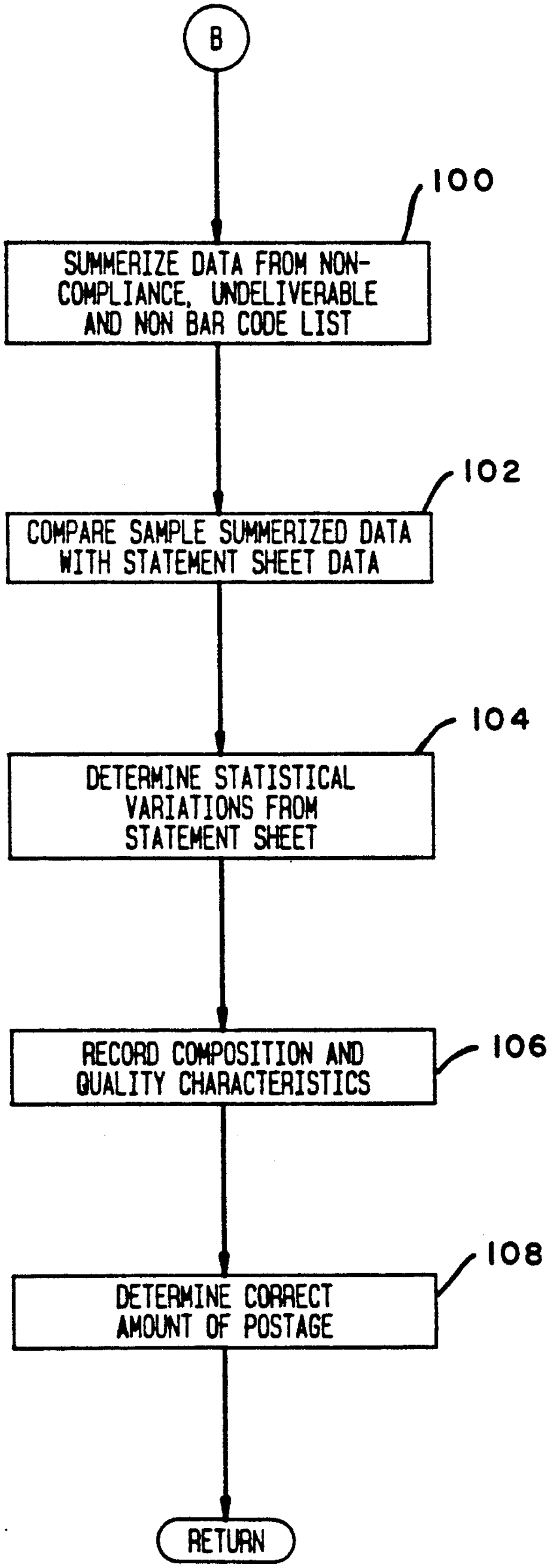

Referring now to FIGS. 2-4, a detailed description of the program that controls the functioning of the components shown in FIG. 1 will be given. Referring initially to FIG. 2, at the start the inquiry is made 50 whether a mail piece has arrived at the singulator. If the mail piece has not arrived, there is a return, but if it has, an ordinal number is assigned 52 that uniquely identifies such mail piece. These ordinal numbers are assigned in sequence in order to monitor or track each of the mail pieces. The size of each mail piece is then measured 54, and the dimensions are compared against the postal classification for dimensions. An inquiry is then made as to whether the mail piece conforms to the standard sizes 56. If the response is no, these dimensions, as well as the ordinal number of the particular mail piece, are delivered to a memory list 57 within the microcomputer's memory. After the determination or, if the piece is within the standard sizes allowed by the Post Office, the piece is then weighed and compared 58 against the postal mail classification for that type of mail. The type of mail will have been input by the operator through the keyboard or through the outside data source input 23. The inquiry is then made whether the weight falls within the postal classification 60. If not, then the weight and ordinal number of that particular mail piece is again stored within a memory list 57 for weights within the microcomputer. After the standard weight classification test, then a determination of readability is made 62. An inquiry is then made whether the mail piece is within OCR readability standards 64. Again, if it is not within the standards, this is recorded within the memory list 57 of the microprocessor. The mail piece is then passed on. A determination is then made relative to the optical character reading physical characteristics of the address block 66. More specifically, determination is made as to the contrast, the reflectivity, the print font types, and the like. Upon completion of the determination of the OCR characteristics, then an out of tolerance summary of the mail batch is made 68, and the percent of non-compliance of the mail pieces is stored in memory. It will be noted that one mail piece may have more than one parameter for which it is out of compliance, but because of the notation of the ordinal number for each mail piece, the total number of mail pieces out of compliance will be reported. This portion of the program completes the compliance for categorization.

The next part of the program is disclosed in FIG. 3 and deals with the mail deliverability and certification. The address block contents are first read 70. The last line of the address block is located 72, the last line being that line which has the city, state, and zip code. The zip code is then read 74. An inquiry is made whether the zip code can be found in the national zip+4 data base 76. If it cannot, then this is stored in the undeliverable memory list 78 within the microprocessor. An inquiry is then made as to whether the city and state match the zip code that is printed on the address line 80. If not, again this non-compliance is sent to the memory list 78. The next inquiry is whether there is a pre-printed postal bar code on the envelope 82. If not, this information is sent to a non-bar list memory in the microprocessor 84 so that the postal service may charge the mailer for not having the pre-printed bar code, but if there is, the pre-printed bar code is read 86. An inquiry is made as to whether the zip code and bar code match 88. If not, this information is stored within memory 78, but if so, then the mail piece is simply forwarded.

After all the information has been obtained from the mail pieces 12, the summarization of such data takes place as is described in FIG. 4. A summarization is first made as to the mail category with regard to compliance with sizes, class of mail, weights and the like in conjunction with the non-compliance lists 100. After this summarization is made, a comparison is made 102 with the summary data on the statement sheet that accompanies the batch of mail and which has been entered into the microcomputer 20 through the keyboard by the operator or outside source 23. A determination is then made of the variation from the statement sheet 104. Following this, quality characteristics report is made which includes such things as readability 106. After such report is made, a determination is made as to the correct amount of postage 108. As indicated, the amount of postage will be determined by whether there is OCR readable address blocks, zip codes, wrong weights for a statistical class, outsized envelopes and the like. This information will then be included in the report that is prepared following the completion of the summarization.

Thus, what has been shown and described is an apparatus and method for categorizing and certifying mail whereby the Post Office is able to process mail more efficiently and quickly.

What is claimed is:

1. In a system for categorizing mail, the combination comprising:

- means for conveying mail pieces in series,
- means for assigning an identification number to each mail piece,
- means for measuring the dimensions of each sample mail piece and comparing them to acceptable dimensions in the postal regulations,
- means for weighing and comparing the weight of each mail piece against a standard,
- means for determining the OCR physical characteristics of each mail piece,
- means for reading the zip code of each mail piece,
- means for determining if the zip code is included in the national zip+4 data base, and
- means for determining if the city and state printed on each sample mail piece matches the zip code printed thereon.

2. The apparatus of claim 1 including means for identifying the class of mail of said mail.

3. The apparatus of claim 2 including means for identifying those mail pieces that do not conform in size, OCR physical characteristics and weight to the post office regulations for acceptability, whose zip code is not included with the zip plus 4 post office data base and whose city and state do not match the zip code.

4. The apparatus of claim 3 including means for printing a report that includes postage information for the batch of mail based upon information obtained including size, weight, class and postage required for said batch of mail to thereby certify the mail.

5. A method of certifying mail, the steps comprising:

conveying mail pieces from said batch of mail in series, assigning an identification number to each mail piece, measuring the dimensions of each mail piece and comparing them to acceptable dimensions in the postal regulations, weighing and comparing the weight of each mail piece against a standard, determining the OCR physical characteristics of each mail piece, identifying and reading the last line of each mail piece, reading the zip code of each mail piece, determining if the zip code is included in the national zip+4 data base, and determining if the city and state printed on each mail piece matches the zip code printed thereon.

6. The method of claim 5 including the step of identifying the class of mail of said mail pieces.

7. The method of claim 6 including the steps of identifying those mail pieces that do not conform in size, OCR physical characteristics and weight to the post office regulations for acceptability, whose zip code is not included within the zip plus 4 post office data base and whose city and state do not match the zip code.

8. The method of claim 7 including the step of printing a report that includes postage information for the batch of mail based upon information obtained from said mail pieces including size, weight, class and postage required for said batch of mail to certify the mail.

* * * * *